(12) United States Patent
Kise

(10) Patent No.: US 7,545,975 B2
(45) Date of Patent: Jun. 9, 2009

(54) THREE-DIMENSIONAL OBJECT RECOGNIZING SYSTEM

(75) Inventor: Katsuyuki Kise, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 680 days.

(21) Appl. No.: 11/139,801

(22) Filed: May 31, 2005

(65) Prior Publication Data

US 2005/0264557 A1  Dec. 1, 2005

(30) Foreign Application Priority Data

Jun. 1, 2004  (JP) .............................. 2004-163611

(51) Int. Cl.
*G06K 9/00* (2006.01)
(52) U.S. Cl. ...................... 382/154; 382/156
(58) Field of Classification Search ................. 382/104, 382/106, 154, 156, 157
See application file for complete search history.

(56) References Cited

U.S. PATENT DOCUMENTS

| | | | |
|---|---|---|---|
| 6,853,738 B1 * | 2/2005 | Nishigaki et al. ........... 382/106 |
| 2003/0235332 A1 * | 12/2003 | Moustafa ..................... 382/157 |
| 2004/0022416 A1 * | 2/2004 | Lemelson et al. ........... 382/104 |
| 2006/0013475 A1 * | 1/2006 | Philomin et al. ............ 382/156 |
| 2006/0140449 A1 * | 6/2006 | Otsuka et al. ............... 382/104 |

FOREIGN PATENT DOCUMENTS

| | | |
|---|---|---|
| EP | 0 921 374 A2 | 6/1999 |
| EP | 1 192 597 A0 | 4/2002 |
| JP | 02-039286 | 2/1990 |
| JP | 2-39286 A * | 2/1990 |
| JP | 05-019052 | 1/1993 |
| JP | 5-19052 A * | 1/1993 |
| JP | 05-280953 | 10/1993 |
| JP | 5-280953 A * | 10/1993 |

(Continued)

OTHER PUBLICATIONS

Zhao et. al, "Stereo and Neural Network-Based Pedestrian Detection" Sep. 2000, IEEE Transactions on Intelligent Transportation Systems, vol. 1, No. 3, pp. 148-154.*

(Continued)

*Primary Examiner*—Andrew W Johns
(74) *Attorney, Agent, or Firm*—McGinn IP Law Group, PLLC

(57) ABSTRACT

A three-dimensional object recognizing system comprises a distance image generating portion for generating a distance image by using image pairs picked up by a stereoscopic camera, a grouping processing portion for grouping the distance data indicating the same three-dimensional object on the distance image, an input value setting portion for setting an area containing distance data group of grouped three-dimensional object on the distance image and also setting input values having typical distance data as elements every small area that is obtained by dividing the area by a set number of partition, a computing portion for computing output values having a pattern that responds to a previously set three-dimensional object by using a neural network that has at least the input values Xin as inputs to an input layer, and a discriminating portion for discriminating the type of the three-dimensional object based on the pattern of the output values.

20 Claims, 11 Drawing Sheets

FOREIGN PATENT DOCUMENTS

| | | | |
|---|---|---|---|
| JP | 06-174839 | | 6/1994 |
| JP | 6-174839 A | * | 6/1994 |
| JP | 11-230745 | | 8/1999 |
| JP | 2001-143072 | | 5/2001 |

OTHER PUBLICATIONS

Sahambi et al. "A Neural-Network Appearance-Based 3-D Object Recognition Using Independent Component Analysis", Jan. 2003, IEEE Transactions On Neural Networks, vol. 14, No. 1, pp. 138-149.*

Umeda et al., "Subpixel Stereo Method: a New Methodology of Stereo Vision" Apr. 2000, Proceedings of the 2000 IEEE International Conference on Robotics and Automation, pp. 3215-3220.*

European Search Report dated Sep. 23, 2005.

P. Tsui et al., "A Neural Network Based Vision System for 3D Motion Estimations", Intelligent Control/Intelligent Systems and Semiotics, 1999, Proceedings of the 1999 IEEE International Symposium on Cambridge, MA, USA, Sep. 15-17, 1999, Piscataway, NJ, USA, IEEE, US, pp. 248-253, XP010352673.

Vincent W. Porto, "Evolutionary Methods for Training Neural Networks for Underwater Pattern Classification", Chen R R Institute of Electrical and Electronics Engineers: Proceedings of the Asilomar Conference on Signals, Systems and Computers. Pacific Grove, Nov. 5-7, 1990, New York, IEEE, US, vol. vol. 2 Conf. 24, Nov. 5, 1990, pp. 1015-1019, XP000299546.

Xin Yao. "Evolving Artificial Neural Networks", Sep. 1999, Proceedings of the IEEE, IEEE, New York, US, p. 1423-1447, XP000945667, ISSN: 0018-9219.

Nobuyuki Yoshizawa, et al., "Object Recognition by Neural Network Using Thickness data from Acoustic Image", Jan. 1993, Systems & Computers in Japan, Scripta Technica Journals. New York, US, pp. 95-105, XP000432444, ISSN: 0882-1666.

* cited by examiner

THREE-DIMENSIONAL OBJECT RECOGNIZING SYSTEM

The present application claims foreign priority based on Japanese Patent Application No. 2004-163611, filed Jun. 1, 2004, the contents of which is incorporated herein by reference.

BACKGROUND OF THE INVENTION

1. Technical Field

The present invention relates to a three-dimensional object recognizing system for discriminating the type of a three-dimensional object by using a distance image constructed by the distribution of three-dimensional distance information.

2. Related Art

In the related art, as the three-dimensional measuring technology based on the image, there is known the image processing by using the so-called stereo method. According to this method, a correlation between a pair of images of the object picked up by the stereoscopic camera comprising two cameras from different positions is found, and then three-dimensional image information (distance image) up to the object are picked up from a parallax caused on the same object based on the principle of triangular survey by using camera parameters such as fitting positions, focal lengths, etc. of the stereoscopic camera. In recent year, the three-dimensional object recognizing system using the image processing of this type is put into practical use. For instance, in the onboard three-dimensional object recognizing system, the technology to recognize the three-dimensional objects on the image such as white line, side wall such as guard rail, curb, or the like extending along the road, vehicle, and the like by applying the grouping process to the data on the distance image and then comparing a distribution of the grouped distance information with previously stored three-dimensional route profile data, side wall data, three-dimensional object data, or the like has been established.

In addition, in order to recognize the three-dimensional object by using the distance image in more detail (to discriminate the type of the three-dimensional object), in JP-A-2001-143072 (which is referred as Patent Literature 1), for example, the body profile discriminating system (three-dimensional object recognizing system) is disclosed. This body profile discriminating system comprises a background cutting-out unit for cutting out only the distance image concerning the object by removing the background from the distance image; a silhouette center/depth mean calculating unit for calculating a silhouette center and a depth mean of the cut object area; an object area translating unit for translating the silhouette center to an image center; a distance image recomposing unit for recomposing newly the distance image by calculating heights of curves, which are defined by the translated distance image, by means of the interpolation when viewed from respective lattice points under the condition that meshes having a predetermined interval are defined on a plane that is parallel with the plane onto which the distance image is projected and is separated by the depth mean; a dictionary database for accumulating the distance images generated via the background cutting-out unit, the silhouette center/depth mean calculating unit, the object area translating unit, and the distance image recomposing unit after the distance images obtained by using an angle of rotation around a surface normal and an angle of the surface normal to an optical axis of a three-dimensional profile measuring system as parameters when respective object models take their stable attitudes on the plane are input; and a collating/discriminating unit for discriminating the object by collating an output from the distance image recomposing unit with information in the dictionary database after the distance image of the object is input.

However, in the technology disclosed in above Patent Literature 1, complicated processes such as translation of the object, recomposition of the distance image, collation between the distance image and the dictionary database, and so on must be taken to discriminate the type of the three-dimensional object.

Also, in the above technology, in order to discriminate the three-dimensional object with good precision, the dictionary database about the object serving as the discrimination object must be formed in detail. However, since much time and labor are required to form such dictionary database, such dictionary database formation is not a realistic measure.

In addition, in some cases the noise, etc. are generated in the picked-up image according to the shooting environment, and the like. In case such the noise, etc. are generated, a mismatching between the pixels, an omission of the distance data, etc. are caused in generating the distance image. As a result, it is likely that a discriminating precision of the three-dimensional object is lowered.

SUMMARY OF THE INVENTION

The present invention has been made in view of the above circumstances, and it is an object of the present invention to provide a three-dimensional object recognizing system capable of discriminating a three-dimensional object with good precision by a simple processing not to need an enormous database, or the like.

However, the present invention need not achieve the above objects, and other objects not described herein may also be achieved. Further, the invention may achieve no disclosed objects without affecting the scope of the invention.

The present invention provides a three-dimensional object recognizing system, which comprises a distance image generating portion for generating a distance image including three-dimensional distance data of a picked-up object, by using images picked up by an imaging portion; a grouping processing portion for grouping the distance data indicating a same three-dimensional object on the distance image; an input value setting portion for setting an area having a previously set predetermined profile and containing distance data group of grouped three-dimensional object on the distance image, and setting input values having typical distance data as elements every small area that is obtained by dividing the area by a set number of partition; a computing portion for computing output values having a pattern that responds to a previously set three-dimensional object by using a neural network that has at least the input values as inputs to an input layer; and a discriminating portion for discriminating the three-dimensional object based on the pattern of the output values computed by the computing portion.

According to the three-dimensional object recognizing system of the present invention, it is feasible to discriminate the three-dimensional object with good precision by the simple processing not to need the enormous database, or the like.

DETAILED DESCRIPTION OF THE INVENTION

Figure 2:
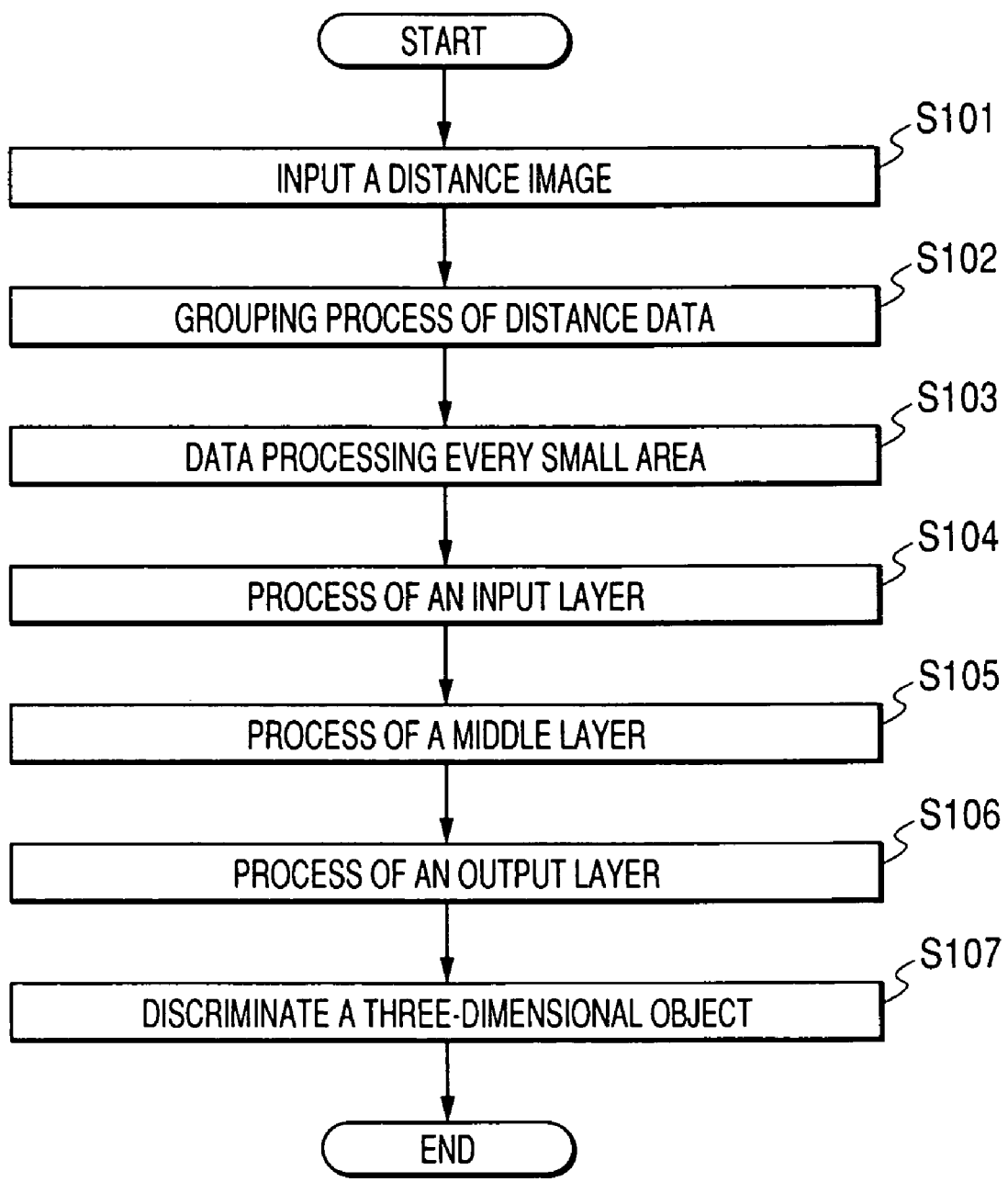
FIG. 2 is a flowchart showing a three-dimensional object recognizing routine.
Figure 3:
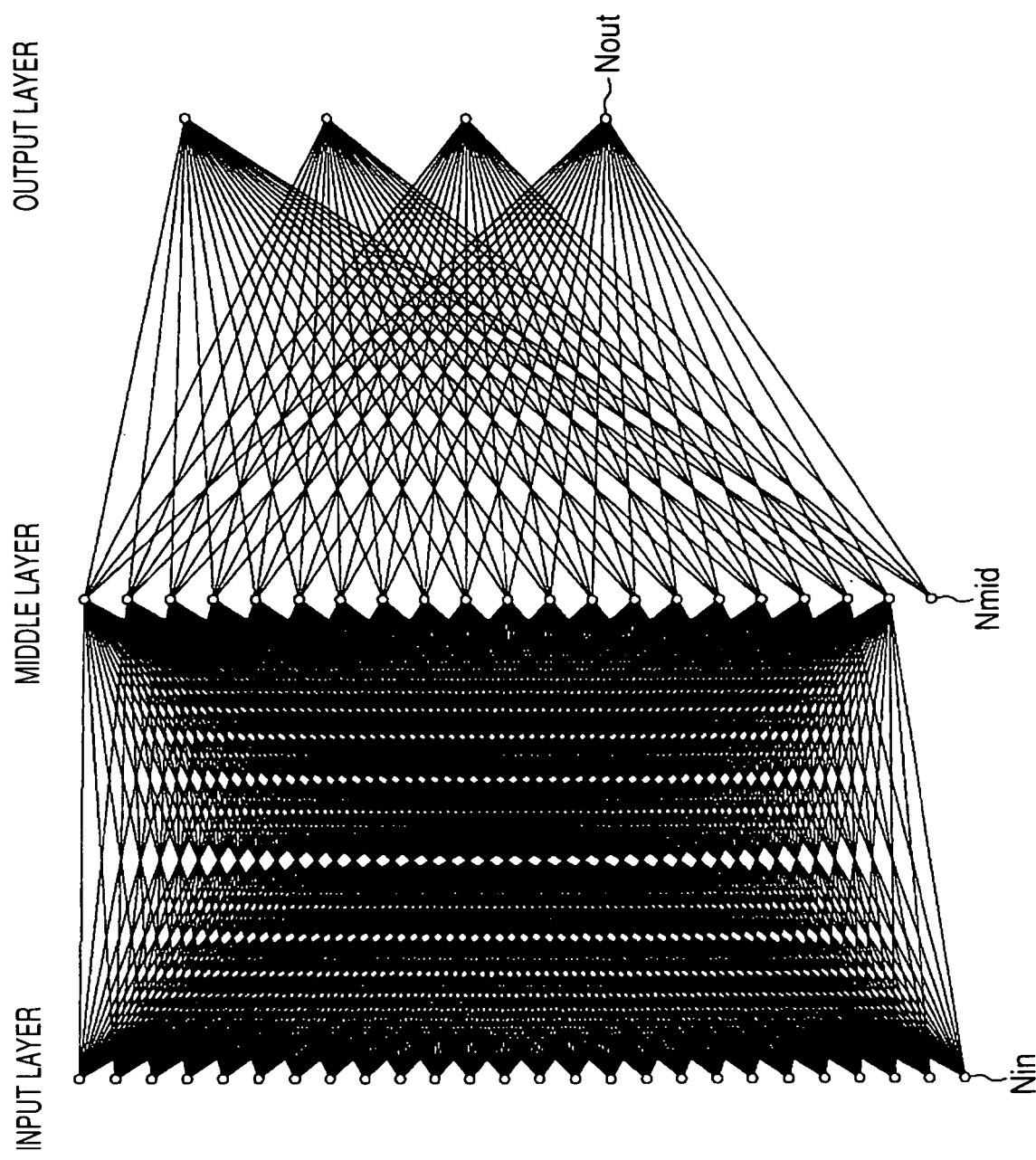
FIG. 3 is an explanatory view of a neural network applied to discriminate the type of the three-dimensional object.
Figure 4:
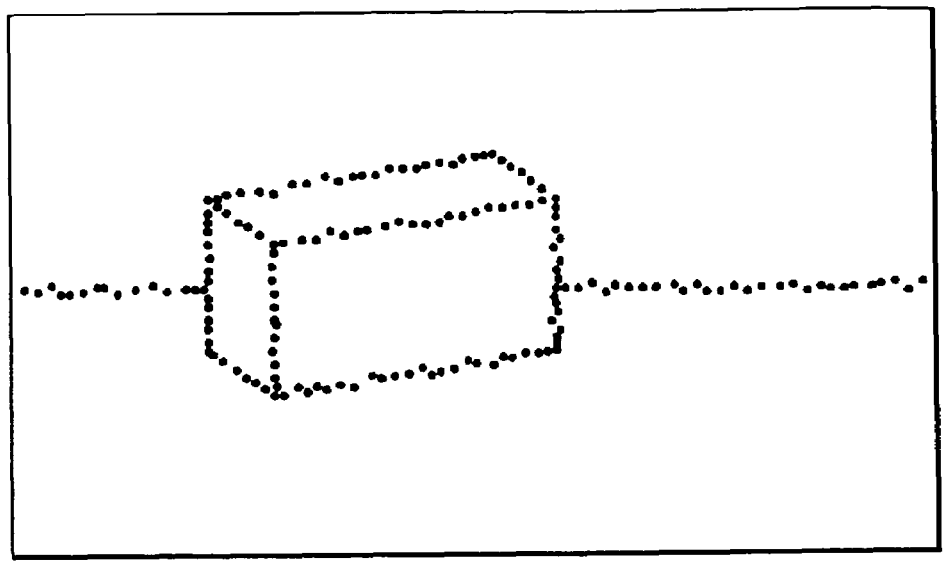
FIG. 4 is an explanatory view showing an example of a distance image.
Figure 5:
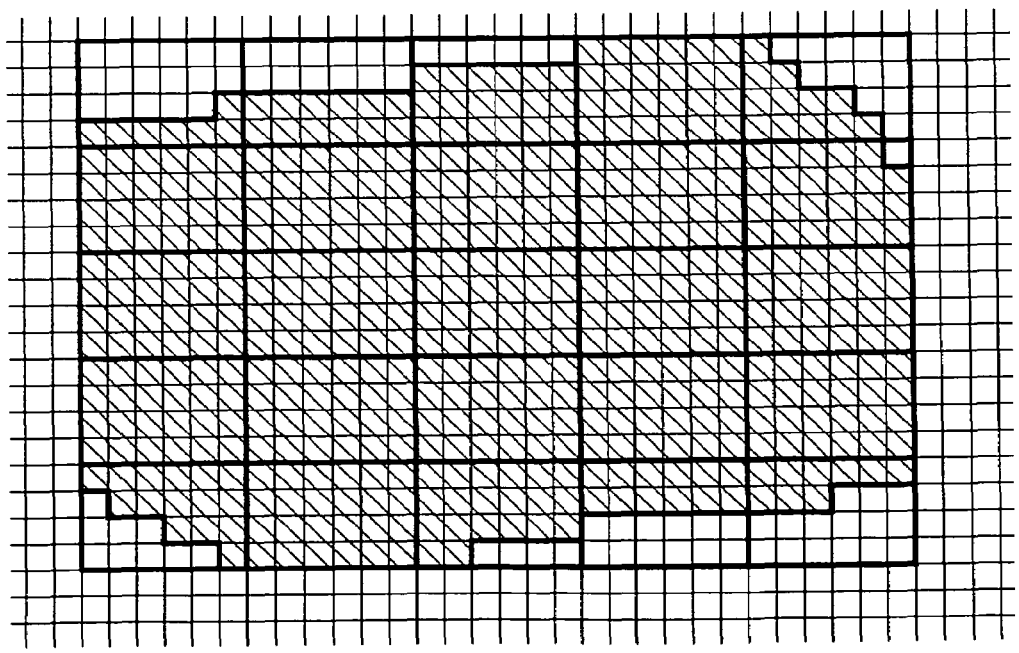
FIG. 5 is an explanatory view showing an example of an area that contains a distance data group on the distance image.
Figure 6:
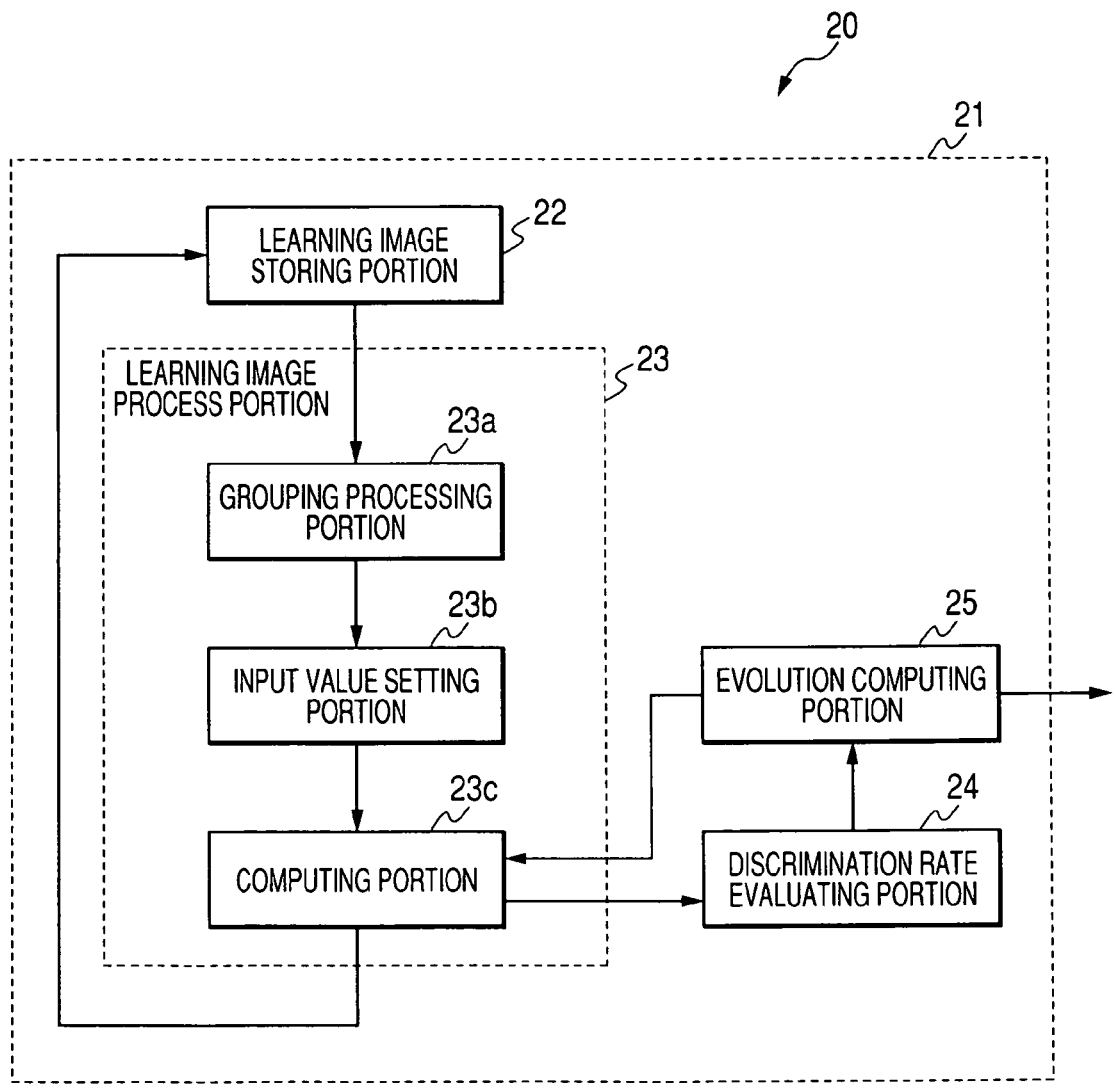
FIG. 6 is a schematic configurative view of a control parameter learning unit.
Figure 7:
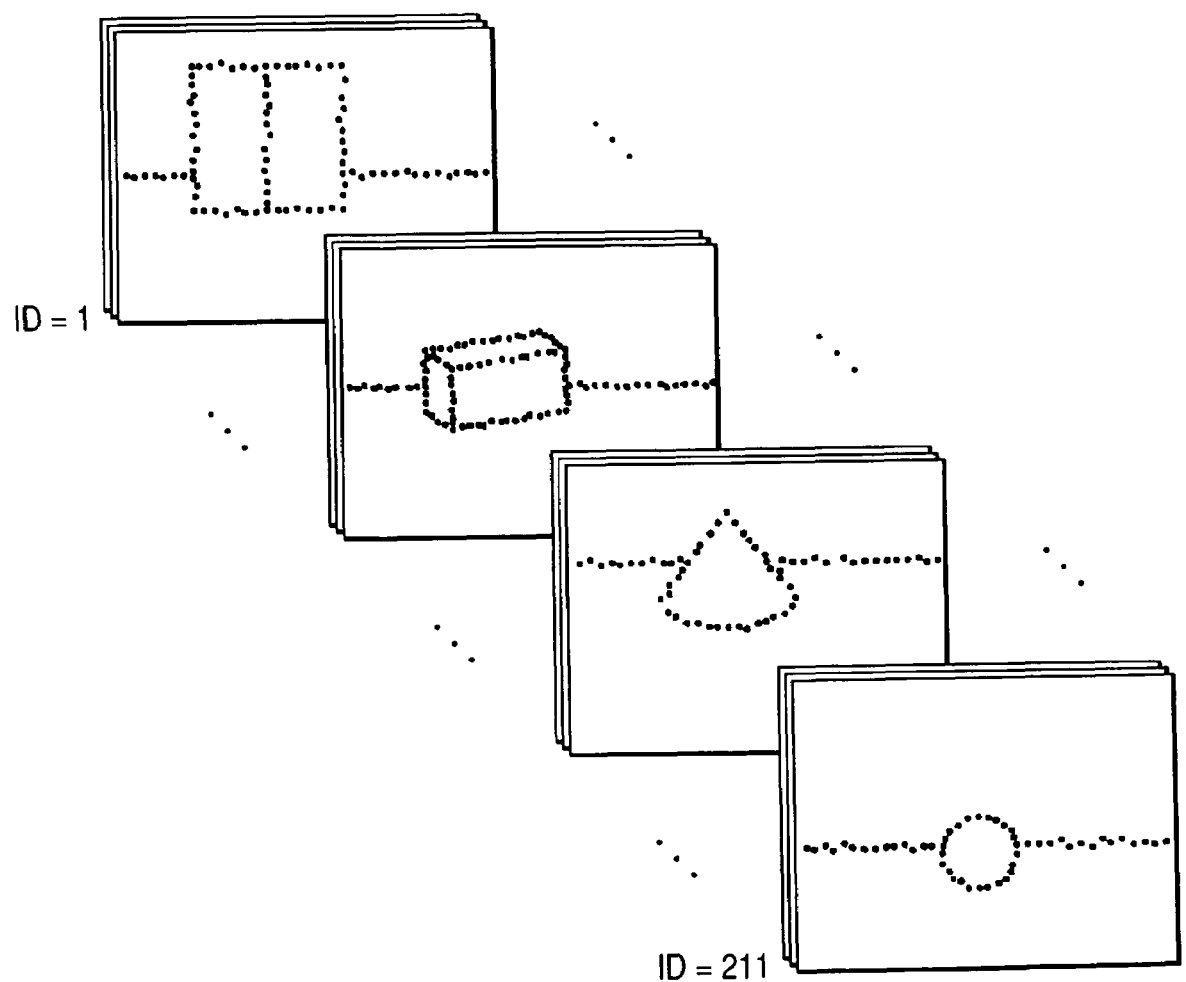
FIG. 7 is an explanatory view showing respective learning images.
Figure 8:
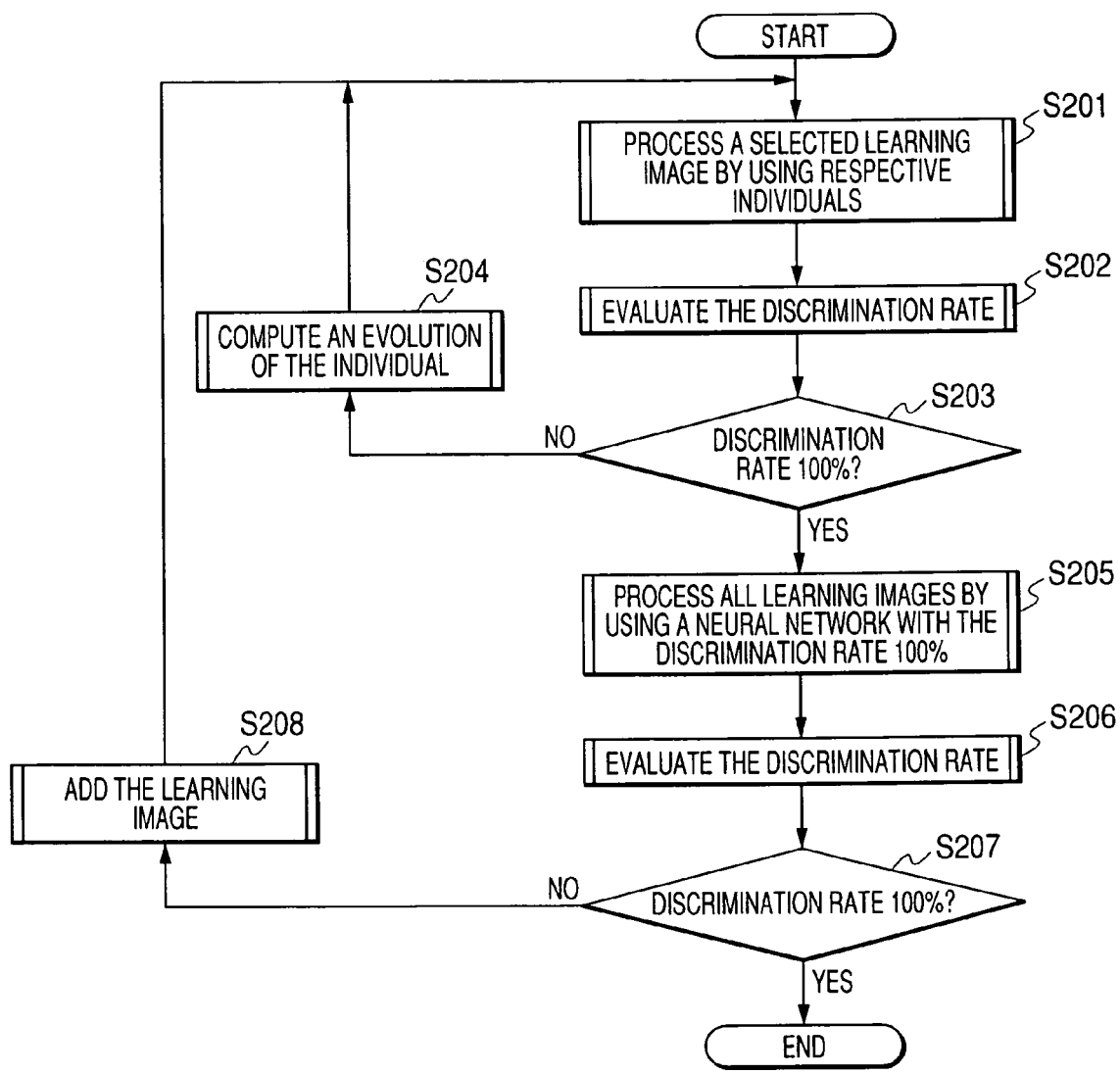
FIG. 8 is a flowchart showing a main routine of a control parameter learning processing.
Figure 9:
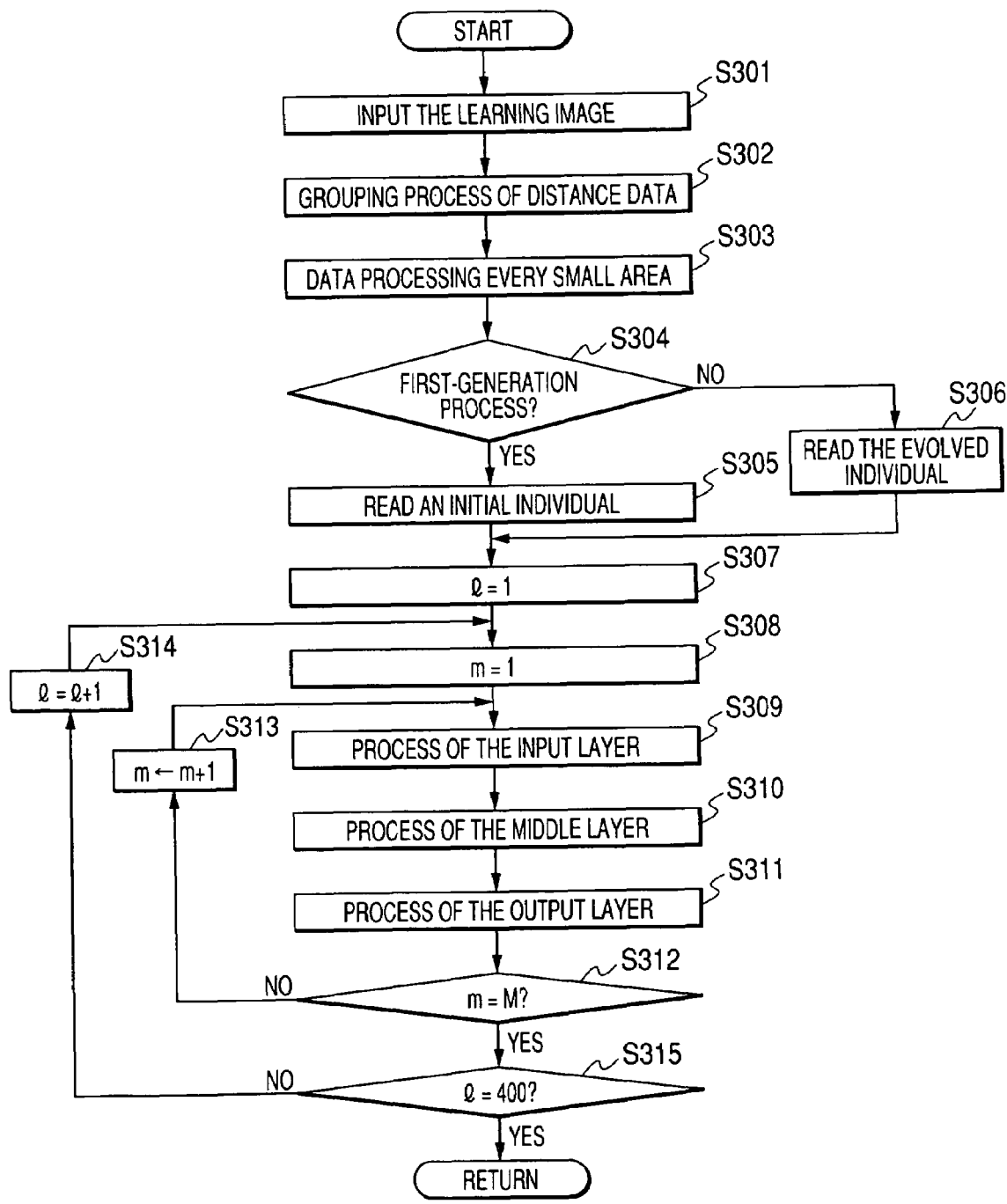
FIG. 9 is a flowchart showing a learning image processing subroutine.
Figure 10:
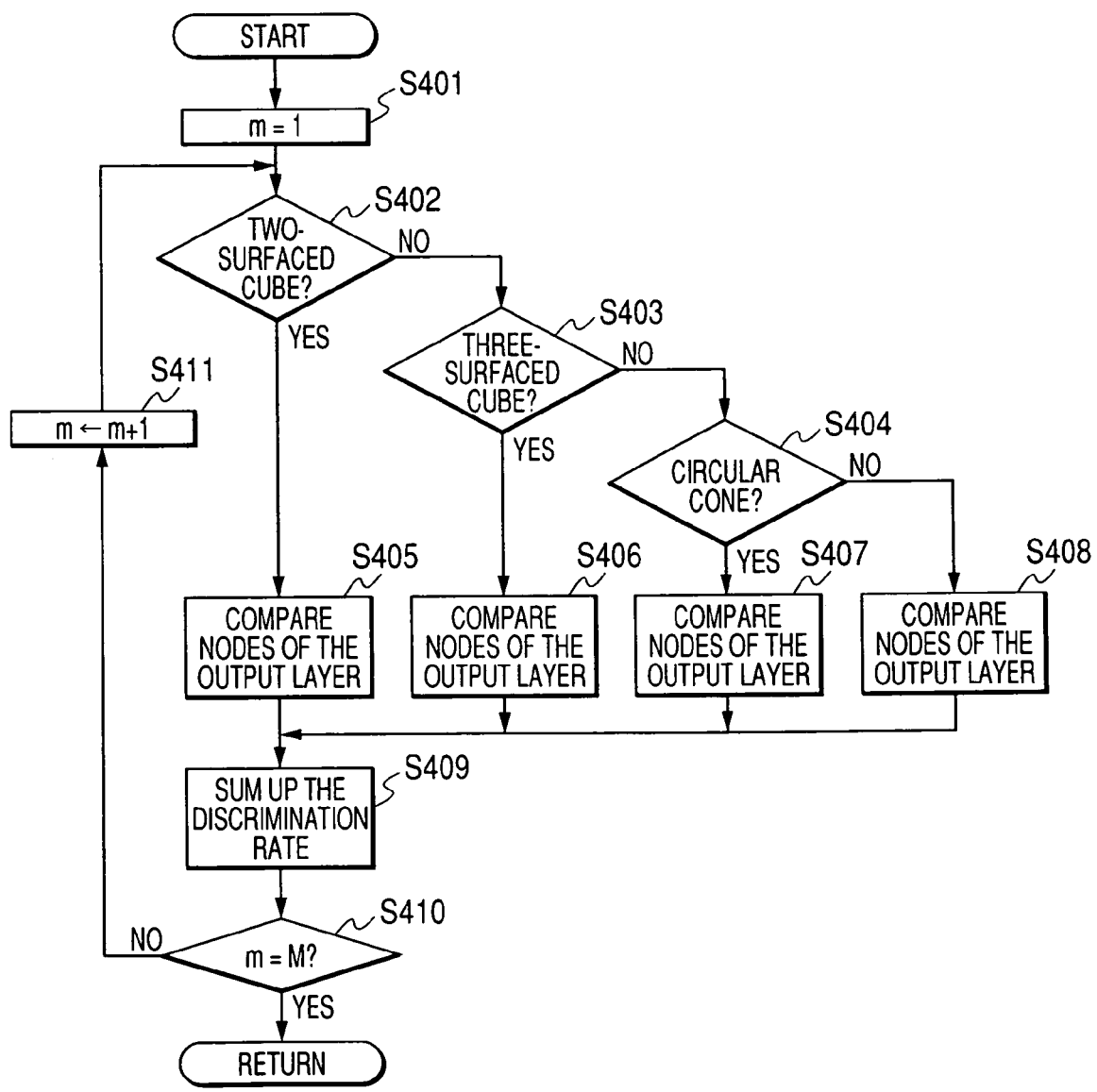
FIG. 10 is a flowchart showing a discrimination rate evaluating subroutine.
Figure 11:
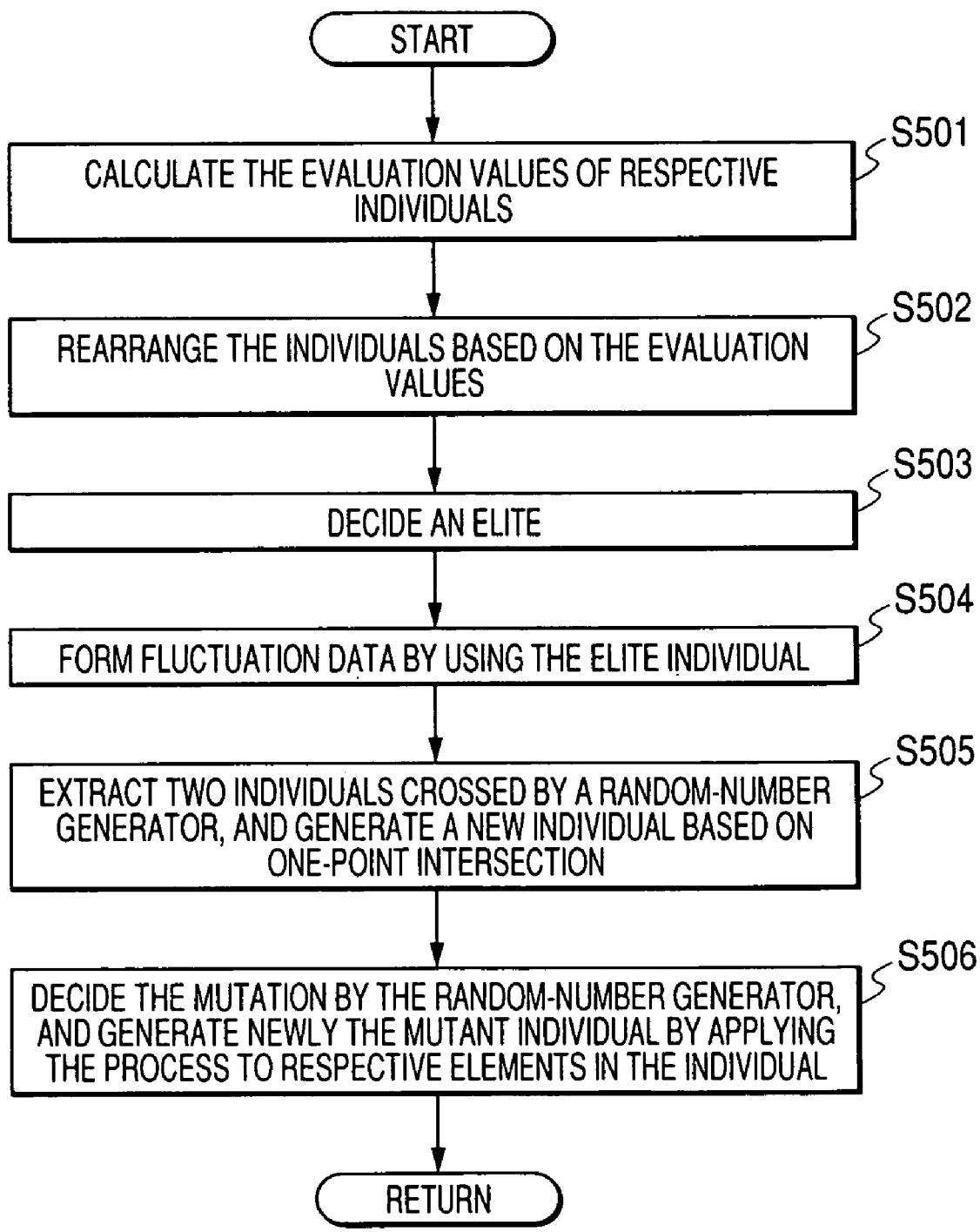
FIG. 11 is a flowchart showing an evolution computing subroutine of the control parameter.
Figure 12:
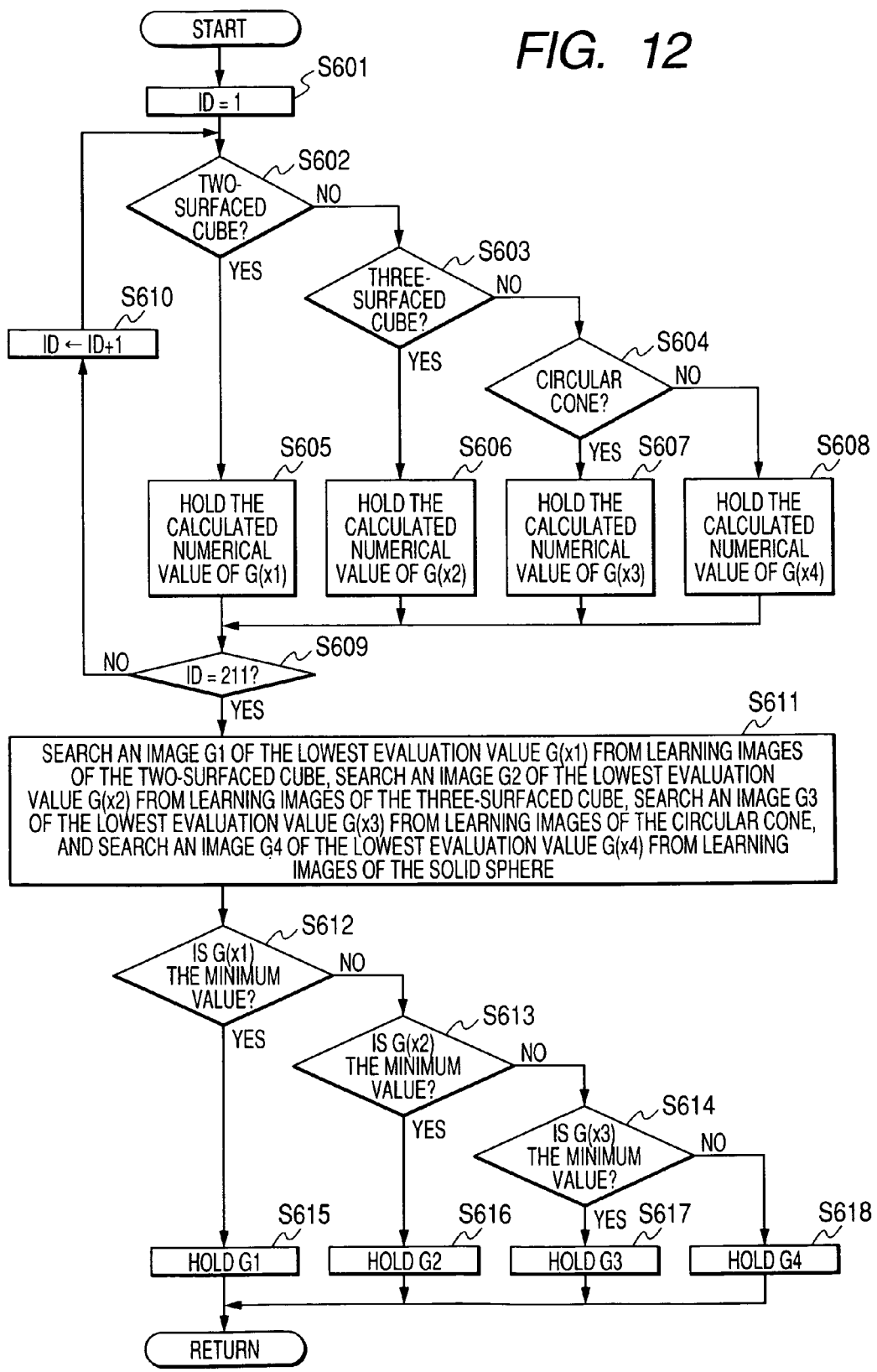
FIG. 12 is a flowchart showing an additional subroutine of the learning image.

An embodiment of the present invention will be explained with reference to the drawings hereinafter. These drawings are concerned with an embodiment of the present invention, wherein FIG. 1 is a schematic configurative view of a three-dimensional object recognizing system, FIG. 2 is a flowchart showing a three-dimensional object recognizing routine, FIG. 3 is an explanatory view of a neural network applied to discriminate the type of the three-dimensional object, FIG. 4 is an explanatory view showing an example of a distance image, FIG. 5 is an explanatory view showing an example of an area that contains a distance data group on the distance image, FIG. 6 is a schematic configurative view of a control parameter learning unit, FIG. 7 is an explanatory view showing respective learning images, FIG. 8 is a flowchart showing a main routine of a control parameter learning processing, FIG. 9 is a flowchart showing a learning image processing subroutine, FIG. 10 is a flowchart showing a discrimination rate evaluating subroutine, FIG. 11 is a flowchart showing an evolution computing subroutine of the control parameter, and FIG. 12 is a flowchart showing an additional subroutine of the learning image.

Figure 1:
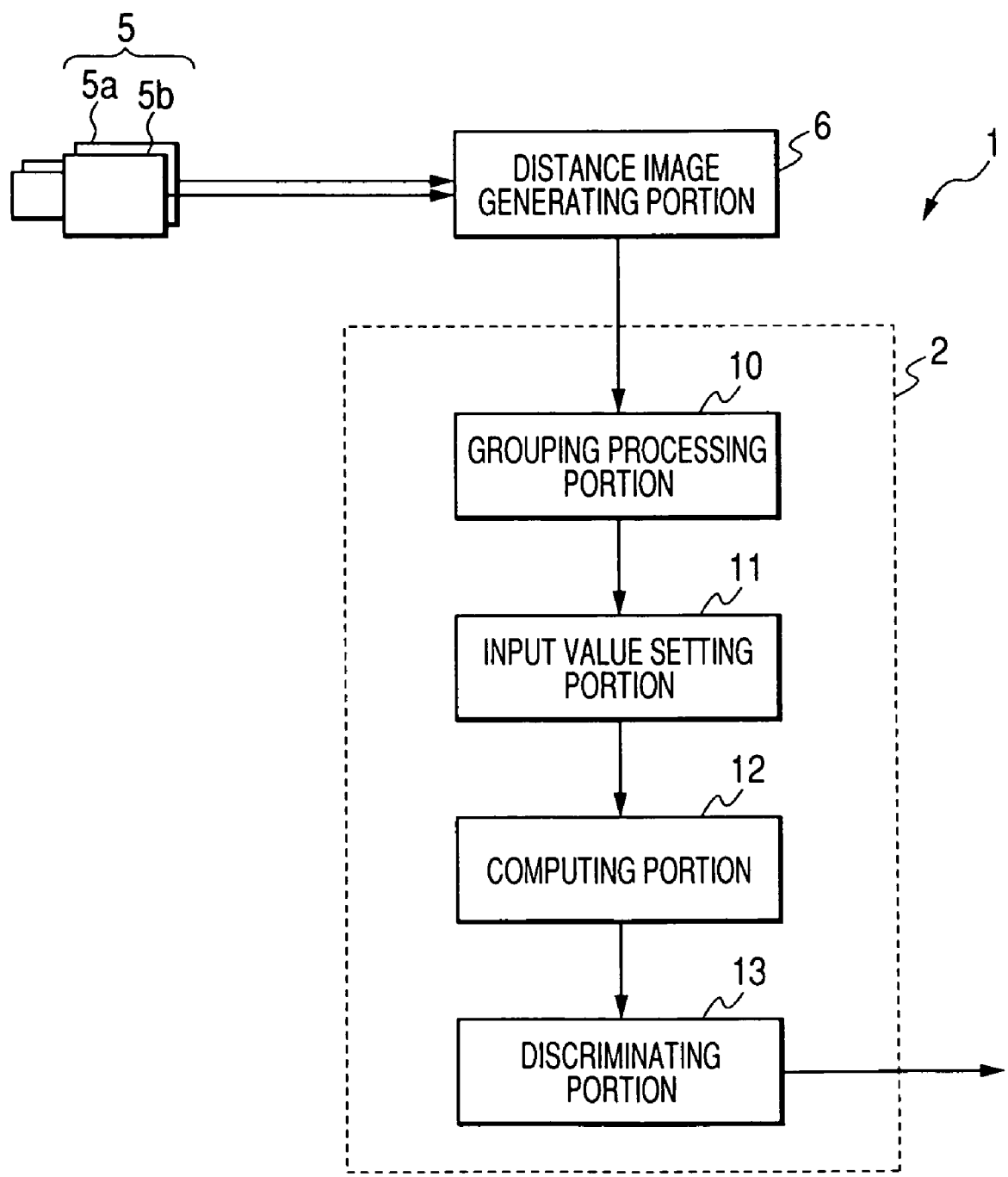
FIG. 1 is a schematic configurative view of a three-dimensional object recognizing system.

In FIG. 1, a reference symbol 1 denotes a three-dimensional object recognizing system having a function of discriminating the type of the three-dimensional object. The three-dimensional object recognizing system 1 includes a computer 2 having CPU, ROM, RAM, I/O interface, etc., and a pertinent portion of the system is constructed by connecting a stereoscopic camera (imaging portion) 5 to the I/O interface of the computer 2 via a distance image generating portion 6.

The stereoscopic camera 5 comprises two high-resolution (e.g., 1300×1030 pixels) CCD cameras 5a, 5b that are operated in synchronism with each other, for example. One CCD camera 5a is used as a main camera and the other CCD camera 5b is used as a sub camera, and the CCD cameras 5a, 5b are arranged such that mutual perpendicular axes to the image pick-up planes are parallel to over a predetermined base line length.

The distance image generating portion 6 has analogue interfaces each having a gain control amplifier and A/D converters that convert analogue image data into digital image data, in answer to respective analogue signals fed from the CCD cameras 5a, 5b. Also, the distance image generating portion 6 has respective function portions such as a LOG transformation table composed of the high-integrated FPGA, for example, to apply the logarithmic transformation to light and dark portions of the image, and others. Then, the distance image generating portion 6 adjusts a signal balance between picked-up image signals fed from the CCD cameras 5a, 5b by executing the gain control respectively, then converts the picked-up image signals into digital image data having pre-determined luminance/tone by correcting the image, e.g., improving the contrast of the low luminance portion by the LOG transformation, and then stores the resultant image data in a memory. Also, the distance image generating portion 6 has a city block distance computing circuit, a minimum value/pixel displacement sensing circuit, etc., which are composed of the high-integrated FPGA, for example. Thus, the distance image generating portion 6 applies a stereoscopic matching process to two sheets of stored images comprising a main image and a sub image to specify corresponding areas, i.e., finds a correlation between them by calculating the city block distance every small area of each image, and then generates three-dimensional image information (distance image) by digitizing perspective information of the object obtained based on the pixel displacement caused in response to the distance up to the object (=parallax) as distance data.

The computer 2, if looked at from a functional aspect, has a grouping processing portion 10, an input value setting portion 11, a computing portion 12, and a discriminating portion 13. Here, for the sake of simplicity of explanation, in the present embodiment, the case where the three-dimensional object on the distance image should be discriminated into any one of a two-surfaced solid body (three-dimensional object only the images of two surfaces of which are picked up by the stereoscopic camera 5), a three-surfaced solid body (three-dimensional object the images of three surfaces of which are picked up by the stereoscopic camera 5), a circular cone, or a solid sphere will be explained by way of example hereunder. In other words, the three-dimensional object recognizing system 1 shown in FIG. 1 discriminates the three-dimensional object (cube, circular cone, or solid sphere) whose image is picked up by the stereoscopic camera 5 under various shooting conditions as any one of a two-surfaced cube, a three-surfaced cube, a circular cone, or a solid sphere.

The grouping processing portion 10 groups the distance data indicating the same three-dimensional object on the distance image (see FIG. 4, for example) input from the distance image generating portion 6. To explain in detail, first the grouping processing portion 10 detects a plane on which an object serving as a recognized object is put. In other words, the grouping processing portion 10 approximates the distance data on the distance image with a linear expression based on the method of least squares every line, and then extracts only the distance data that are within a specified range from an approximate straight line as the data used to detect the plane and also eliminates the data that are out of the specified range. This process is executed sequentially while scanning the image in the vertical direction, so that the distance data that do not constitute the plane are removed from the distance image as singular points. Then, the grouping processing portion 10 converts sample area coordinate systems and the distance data, which are set on the distance image after removal of the singular points, into the coordinate system of a real space that contains the stereoscopic camera 5 as an origin, and then solves ternary simultaneous equations by forming a matrix and decides respective coefficients a, b, c such that the converted data can be fitted to a planar equation given by following Eq.(1) by using the method of least squares.

$$ax+by+cz=1 \qquad (1)$$

In this case, the above process of calculating the planar expression is described in detail in JP-A-11-230745 filed by the applicant of this application, for example.

In addition, the grouping processing portion 10 extracts the distance data, which are located upper than the plane (which have larger values in the Z-coordinate) based on the derived planar expression, out of the distance data on the distance image as the distance data of the three-dimensional object, and also deletes the distance data, which are located lower than the plane, by substituting "0" into such distance data. Then, the grouping processing portion 10 assigns the same number to the distance data, which are mutually successively distributed vertically and horizontally, out of respective extracted distance data, and thus groups the distance data as distance data groups indicating the same three-dimensional object respectively. At that time, the grouping processing portion 10 deletes the distance data, the piece number of which is smaller than 20, from respective grouped distance data groups.

The input value setting portion 11 sets minimum areas that have predetermined profiles being set previously and contain the distance data group grouped by the grouping processing portion 10 respectively on the distance image, and then calculates typical distance data every small area that is obtained by dividing the concerned areas by the set number of partition. Then, the input value setting portion 11 sets an input value Xin having the typical distance data as an element xi in each small area as an input value to the computing portion 12. To explain in more concrete, in the present embodiment, as shown in FIG. 5, for example, the input value setting portion 11 sets a rectangular profile area to the distance data group, for example. In this case, the input value setting portion 11 first sets a rectangular area surrounding the distance data group on the distance image, and then obtains an area each side of which circumscribes any pixel (distance data) of the distance data group by reducing the concerned area line by line.

Then, the input value setting portion 11 obtains the typical distance data every small area (e.g., mean value of the distance data in the small area) by dividing the set area into small areas in predetermined number of partition (e.g., 5×5=25 small areas), and then sets input values Xin (=x1, . . . , xi, . . . , x25) having these data as elements to the computing portion 12. Here, when the number of vertical and horizontal pixels in the set area is not the multiple of 5, the input value setting portion 11 sets the input values Xin by using all grouped distance data. In other words, the mean value (element xi) of the distance data in every small area is calculated at a subpixel level, and the mean value of the distance data of 1.2×1 pixels is calculated in every small area when the number of pixels in the set area in the vertical direction is 6×5 pixels, for example.

The computing portion 12 calculates output values Yout having patterns that are set previously by using a neural network, which receives at least respective elements xi of the input values Xin set by the input value setting portion 11 as inputs to its input layer, and are different every type of the three-dimensional object. In the present embodiment, the neural network is a hierarchical type neural network comprising the input layer, the middle layer, and the output layer, and each layer contains a plurality of nodes Nin, Nmid, Nout (these are referred to as a node N as a general term hereinafter) respectively.

The number of nodes N constituting respective layers of this neural network is set appropriately by the system designer. In the present embodiment, as shown in FIG. 3, the input layer has 26 nodes Nin, i.e., a node Nin from which an output value yi (i=26)=1.0 is always output as the complement as well as 25 nodes Nin into which respective elements xi (i=1 to 25) of the input values Xin set by the input value setting portion 11 are input, for example. In respective nodes Nin except the node Nin that outputs the complement, the calculation given in Eq.(2) is applied to respective input elements xi (i=1 to 25) and then calculated results yi are output.

$$yi=1/(1+\exp(-xi)) \qquad (2)$$

Accordingly, output values Yin=(y1, . . . , yi, . . . , y25) are output from the input layer to the middle layer as a whole.

Also, the middle layer has 21 nodes Nmid, i.e., a node Nmid from which an output value yj (j=21)=1.0 is always output as the complement as well as the set number (20) of nodes Nmid into which output values Yin output from respective nodes Nin of the input layer are input respectively, for example. In respective nodes Nmid except the node Nmid that outputs the complement, the calculations given in Eq. (3) and Eq. (4) are applied to respective output values Yin output from the input layer and then calculated results yj are output.

$$xj=\Sigma(Kij\cdot yi) \qquad (3)$$

$$yj=1/(1+\exp(-xj)) \qquad (4)$$

Accordingly, output values Ymid=(y1, . . . , yj, . . . , y21) are output from the middle layer to the output layer as a whole.

Also, the output layer has the set number (4) of nodes Nout that corresponds to the type of the three-dimensional object (e.g., the two-surfaced cube, the three-surfaced cube, the circular cone, and the solid sphere) to be discriminated by the discriminating portion 13 described later, for example. The output values Ymid output from respective nodes Nmid of the middle layer are input into these nodes Nmid respectively. In respective nodes Nout, the calculations given in Eq.(5) and Eq.(6) are applied to respective output values Ymid output from the middle layer and then calculated results yk (k=1 to 4) are output.

$$xk=\Sigma(Kjk\cdot yj) \qquad (5)$$

$$yk=1/(1+\exp(-xk)) \qquad (6)$$

Accordingly, output values Yout=(y1, . . . , yk, . . . , y4) are output from the output layer as a whole.

Here, Eqs. (2), (4), (6) are called the sigmoid function and are used normally as the function of normalizing the input to the nodes of the neural network.

Also, Kij is a weighting factor between respective nodes of the input layer and the middle layer, and Kjk is a weighting factor between respective nodes of the middle layer and the output layer. The neural network shown in FIG. 3 has 604 weighting factors in total, and these weighting factors are set previously by a control parameter learning unit 20, described later, based on the learning function using a genetic algorithm. Since these weighting factors are set appropriately in the neural network, the output values Yout having a different pattern every type of the three-dimensional object to be recognized can be output from the output layer.

The discriminating portion 13 discriminates the type of the three-dimensional object based on the pattern of the output values Yout calculated by the computing portion 12. More concretely, the discriminating portion 13 decides the three-dimensional object as the two-surfaced cube when the pattern of the output values Yout from the output layer of the neural network is given as y1>y2, y1>y3 and y1>y4, for example. Also, the discriminating portion 13 decides the three-dimensional object as the three-surfaced cube when the pattern is given as y2>y1, y2>y3 and y2>y4, for example. Also, the discriminating portion 13 decides the three-dimensional object as the circular cone when the pattern is given as y3>y1, y3>y2 and y3>y4, for example. Also, the discriminating portion 13 decides the three-dimensional object as the solid sphere when the pattern is given as y4>y1, y4>y2 and y4>y3, for example.

Next, a three-dimensional object recognizing process executed by the above computer 2 (three-dimensional object discriminating process) will be explained in compliance with a flowchart of a three-dimensional object recognizing routine shown in FIG. 2 hereunder. In starting this routine, in step S101, first the computer 2 inputs the distance image generated by the distance image generating portion 6.

Then, in step S102, the computer 2 calculates the planar expression of a plane on which the three-dimensional object is put from the input distance image, and then groups the distance data indicating the same three-dimensional objects located over the plane specified by the planar expression respectively.

Then, when the process goes from step S102 to step S103, the computer 2 sets minimum rectangular areas containing the distance data groups on the distance image, calculates a mean value of the distance data every area that is obtained by dividing the concerned area by 25, and sets input values Xin having these mean values as respective elements xi.

The processes in step S104 to step S106 are executed by using the above neural network. Then, in step S104, the computer 2 executes the process of the input layer. More particularly, the computer 2 executes the calculating process using above Eq. (2) in 25 nodes Nin that correspond to the elements xi of the input values Xin set in step S103 respectively and then outputs the calculated results yi, and also outputs the complement (output value y26=1) from one remaining node Nin.

Then, in step S105, the computer 2 executes the process of the middle layer. More particularly, the computer 2 executes the calculating processes using above Eq. (3) and Eq. (4) in 20 nodes Nmid that correspond to the output values Yin from the input layer respectively and then outputs the calculated results yj, and also outputs the complement (output value y21=1) from one remaining node Nmid.

Then, in step S106, the computer 2 executes the process of the output layer. More particularly, the computer 2 executes the calculating processes using above Eq. (5) and Eq. (6) in 4 nodes Nout that correspond to the output values Ymid from the middle layer respectively and then outputs the calculated results yk.

Then, the process goes to step S107. Here, the computer 2 discriminates the type of the three-dimensional object as any one of the two-surfaced cube, the three-surfaced cube, the circular cone, or the solid sphere based on the patterns of the output values Yout (=(y1, y2, y3, y4)) from respective nodes Nout of the output layer. Then, the process comes out of the routine Next, a configuration of the control parameter learning unit 20 that learns respective control parameters (weighting factors Kij, Kjk) of the neural network, which is applied to the above three-dimensional object recognizing system 1, by using the genetic algorithm will be explained hereunder.

As shown in FIG. 6, this control parameter learning unit 20 is constructed by using a computer 21 having CPU, ROM, RAM, I/O interface, and the like as a main unit. This computer 21, if viewed from a functional viewpoint, has a learning image storing portion 22, a learning image processing portion 23, a discrimination rate evaluating portion 24, and an evolution computing portion 25.

A plurality (e.g., 211 pieces) of learning image prepared previously are stored in the learning image storing portion 22. The learning image storing portion 22 appropriately outputs each learning image selectively to a learning image processing portion 23. Here, respective learning images stored in the learning image storing portion 22 are constructed by the distance image based on image pairs obtained by stereoscopically picking up the image of the three-dimensional object (cube, circular cone, or solid sphere) under various shooting conditions. In the present embodiment, respective learning images are managed by different identification numbers ID (ID=1 to 211) respectively and thus the three-dimensional object in the learning image can be specified by referring to this identification number ID. For example, the learning images having the identification number ID=1 to 46 are generated based on the image pair obtained by picking up the cube (two-surfaced cube), and the learning images having the identification number ID=47 to 106 are generated based on the image pair obtained by picking up the cube (three-surfaced cube). Also, the learning images having the identification number ID=107 to 166 are generated based on the image pair obtained by picking up the circular cone, and the learning images having the identification number ID=167 to 211 are generated based on the image pair obtained by picking up the solid sphere.

The learning image processing portion 23 is constructed to have a grouping processing portion 23a, an input value setting portion 23b, and a computing portion 23c, and executes the processing of the learning image input from the learning image storing portion 22. Now, respective portions constituting the learning image processing portion 23 are constructed almost similarly to the grouping processing portion 10, the input value setting portion 11, and the computing portion 12, described above. In this event, the neural network used in the computing portion 23c has a hierarchical structure in the same mode as the neural network shown above FIG. 3, but the weighting factors Kij, Kjk being set between respective nodes can be varied appropriately in response to the inputs from the evolution computing portion 25 described later. That is, in the present embodiment, for example, the learning image processing portion 23 sets up the neural network in 400 ways having different weighting factors Kij, Kjk respectively in response to the input from the evolution computing portion 25, and executes the calculating process to the input values Xin every built-up neural network.

The discrimination rate evaluating portion 24 evaluates a discrimination rate of the three-dimensional object every neural network, based on the processes result in the learning image processing portion 23. That is, the discrimination rate evaluating portion 24 discriminates the three-dimensional object in the learning image based on the pattern of the output values Yout from the output layer of each neural network, and checks by referring to the identification number ID of the concerned learning image whether or not the output pattern output from the output layer is proper. Then, the discrimination rate of the three-dimensional object per neural network can be calculated by applying such process to all the learning images input into the learning image processing portion 23.

The evolution computing portion 25 sets a plurality of individuals in which the elements corresponding to 604 control parameters (weighting factors Kij, Kjk), for example, set between respective nodes of the neural network are represented by the genetic types, and then sets optimum weighting factors Kij, Kjk by causing them to mutate and inherit based on the genetic algorithm. More particularly, the evolution computing portion 25 generates 400 individuals each having 604 elements as the first-generation individual, for example. The numerical values of the elements constituting each first-generation individual are generated at random by generating the random numbers of the development language. Then, the evolution computing portion 25 sets the optimum weighting factors Kij, Kjk by applying the evolution operations to these individuals based on the genetic algorithm such as selection, mutation, crossover, and the like.

Next, a control parameter (weighting factor) learning process executed by the above computer 21 will be explained in compliance with a flowchart of a main routine of the control parameter learning process shown in FIG. 8 hereunder. In starting this routine, in step S201, first the computer 21 executes the calculating process of the selected learning image by using respective neural networks built up based on the elements of respective individuals.

In the concrete, this process is executed by the learning image processing portion 23 in accordance with a subroutine shown in FIG. 9, for example. That is, in starting the subroutine, in step S301, first the learning image processing portion 23 inputs M predetermined learning images that are selected from respective learning images stored in the learning image storing portion 22. Here, an initial value of the number M of the learning images being input into the learning image processing portion 23 is set to M=4. In this case, the learning image containing the two-surfaced cube, the learning image containing the three-surfaced cube, the learning image containing the circular cone, and the learning image containing the solid sphere are input into the learning image processing portion 23 respectively. Also, when the process of the control parameter learning routine makes progress, additional learning images selected by the process in step S208, described later, as well as above four learning images are input into the learning image processing portion 23. In this case, different identification numbers m (m=1 to M (M≧4)) are affixed to the learning images being input from the learning image storing portion 22 respectively.

In step S302, the learning image processing portion 23 applies a grouping process to the learning images input in step S301 to group the distance data indicating the same three-dimensional object. Then, the process of the learning image processing portion 23 goes to step S303. Then, the learning image processing portion 23 sets minimum rectangular areas containing the distance data groups to the distance data group on the learning image, calculates a mean value of the distance data every area that is obtained by dividing equally the concerned area, and sets input values Xin having these mean values as respective elements xi. In this case, the processes in step S302 and step S303 are almost similar to the processes in step S102 and step S103 executed in the above three-dimensional object recognizing system 1.

If the process goes from step S303 to step S304, the learning image processing portion 23 checks whether or not the process at this time corresponds to the process using the first-generation individual, i.e., only the first-generation individual (initial individual) is set at present in the evolution computing portion 25.

Then, in step S304, if it is decided that only the first-generation individual is set in the evolution computing portion 25 and also the process at this time corresponds to the process using the first-generation individual, the process of the learning image processing portion 23 goes to step S305. The learning image processing portion 23 reads the first-generation individual from the evolution computing portion 25, and then builds up 400 neural networks having the elements of respective read individuals as the weighting factors Kij, Kjk respectively.

In contrast, in step S304, if it is decided that the individual in the second generation, et seq. is set in the evolution computing portion 25 and also the process at this time does not correspond to the process using the first-generation individual, the process of the learning image processing portion 23 goes to step S306. The learning image processing portion 23 reads the newest generation individual from the evolution computing portion 25, and then builds up 400 neural networks having the elements of respective read individuals as the weighting factors Kij, Kjk respectively.

Here, the different identification number l (l=1 to 400) is affixed to each neural network set up in step S305 or step S306 respectively. Also, in the following processes, the learning image processing portion 23 applies the discriminating processes using 400 built-up neural networks to the three-dimensional object in M input learning images respectively.

If the process goes from step S305 or step S306 to step S307, the learning image processing portion 23 selects the neural network of the identification number l=1. Then, in step S308, the learning image processing portion 23 selects the learning image of the identification number m=1.

Then, in step S309 to step S311, the learning image processing portion 23 applies the process using the selected neural network to the distance data group on the selected learning image, like the processes in step S310 to step S310 executed by the above three-dimensional object recognizing system 1. Then, the process goes to step S313.

If the process goes from step S311 to step S312, the learning image processing portion 23 checks whether or not the identification number m of the learning image selected at present corresponds to m=M. Thus, the learning image processing portion 23 can check whether or not the process using the neural network selected at present has been applied to all input learning images.

Then, in step S312, if it is decided that the identification number m of the learning image selected at present is m<M, the process of the learning image processing portion 23 goes to step S313. Thus, the learning image processing portion 23 increments the identification number m (m←m+1) and selects the subsequent learning image. Then, the process goes back to step S309.

In contrast, in step S312, if it is decided that the identification number m of the learning image selected at present is m=M, the process of the learning image processing portion 23 goes to step S314. Thus, in step S314, the learning image processing portion 23 checks whether or not the identification number l of the neural network selected at present corresponds to l=400. Thus, the learning image processing portion 23 can check whether or not the processes using all neural networks have been applied to all input learning images.

Then, in step S314, if it is decided that the identification number l of the neural network selected at present is l<400, the process of the learning image processing portion 23 goes to step S315. Thus, the learning image processing portion 23 increments the identification number l (l←l+1) and selects the subsequent neural network. Then, the process goes back to step S308.

In contrast, in step S314, if it is decided that the identification number l of the neural network selected at present is l=400, the learning image processing portion 23 decides that the processes using all networks set up in step S305 or step S306 have been applied to all learning images input in step S301. Thus, the process gets out of the routine.

Then, in step S202 of the main routine, the computer 21 calculates the discrimination rate of the three-dimensional object by the neural network, based on the processed result of the learning image in step S201. This process is executed every neural network set up in step S201. Concretely, the evaluation of the neural network is executed by the discrimination rate evaluating portion 24 in compliance with the subroutine shown in FIG. 10 respectively, for example. In other words, when the subroutine is started, first the discrimination rate evaluating portion 24 selects the learning image having the identification number of m=1 in step S401.

Then, in step S402, the discrimination rate evaluating portion 24 checks whether or not the identification number ID (the identification number in the learning image storing portion 22) of the selected learning image indicates the two-surfaced cube. Then, if it is decided that such identification number indicates the two-surfaced cube, the process goes to step S405.

If the process goes from step S402 to step S405, the discrimination rate evaluating portion 24 examines the output pattern from the neural network that corresponds to the selected learning image (i.e., compares respective elements yk from respective nodes Nout of the output layer), and then discriminates the three-dimensional object in the learning image based on the output pattern. Then, if the discriminated result indicates the two-surfaced cube, the discrimination rate evaluating portion 24 decides that the three-dimensional object in the learning image is discriminated correctly.

In contrast, in step S402, if it is decided that the identification number ID of the selected learning image does not indicate the two-surfaced cube and then the process goes to step S403, the discrimination rate evaluating portion 24 checks whether or not the identification number ID indicates the three-surfaced cube.

Then, in step S403, if it is decided that the identification number ID indicates the three-surfaced cube, the process of the discrimination rate evaluating portion 24 goes to step S406. Thus, the discrimination rate evaluating portion 24 discriminates the three-dimensional object in the learning image based on the output pattern of the neural network. Then, if the discriminated result indicates the three-surfaced cube, the discrimination rate evaluating portion 24 decides that the three-dimensional object in the learning image is discriminated correctly.

In contrast, in step S403, if it is decided that the identification number ID of the selected learning image does not indicate the three-surfaced cube and then the process goes to step S404, the discrimination rate evaluating portion 24 checks whether or not the identification number ID indicates the circular cone.

Then, in step S404, if it is decided that the identification number ID indicates the circular cone, the process of the discrimination rate evaluating portion 24 goes to step S407. Thus, the discrimination rate evaluating portion 24 discriminates the three-dimensional object in the learning image based on the output pattern of the neural network. Then, if the discriminated result indicates the circular cone, the discrimination rate evaluating portion 24 decides that the three-dimensional object in the learning image is discriminated correctly.

In contrast, in step S404, if it is decided that the identification number ID of the selected learning image does not indicate the circular cone (i.e., it is decided that the identification number indicate the solid sphere) and then the process of the discrimination rate evaluating portion 24 goes to step S408. Thus, the discrimination rate evaluating portion 24 discriminates the three-dimensional object in the learning image based on the output pattern of the neural network. Then, if the discriminated result indicates the solid sphere, the discrimination rate evaluating portion 24 decides that the three-dimensional object in the learning image is discriminated correctly.

If the process goes from step S405, step S406, step S407 or step S408 to step S409, the discrimination rate evaluating portion 24 sums up the discrimination rate by the neural network, based on the decided results in above step S405 to step S408.

If the process goes from step S409 to step S410, the discrimination rate evaluating portion 24 checks whether or not the identification number m of the learning image selected at present corresponds to m=M. Then, in step S410, it is decided that the identification number m of the learning image selected at present is m<M, the process of the discrimination rate evaluating portion 24 goes to step S411. Thus, the discrimination rate evaluating portion 24 increments the identification number m (m←m+1) and selects the subsequent learning image. Then, the process goes back to step S402.

In contrast, in step S410, if it is decided that the identification number m of the learning image selected at present corresponds to m=M, the discrimination rate evaluating portion 24 registers the discrimination rate calculated precedingly in step S409 as the final discrimination rate. Then, the process comes out of the routine.

Then, in step S203 of the main routine, the computer 21 checks whether or not the neural network whose discrimination rate is 100% is present in respective discrimination rates calculated every neural network in step S202. Then, in step S203, it is decided that the neural network whose discrimination rate is 100% is not present, the process goes to step S204. Thus, the computer 21 executes an evolution computation of the individual by using the genetic algorithm. Then, the process goes back to step S201.

Concretely this evolution computation in step S204 is executed by the evolution computing portion 25 in compliance with a subroutine shown in FIG. 11. The evolution computing portion 25 sets 400 new individuals as the next generation individuals, based on 400 individuals used to set up the neural networks in step S201.

In starting the subroutine, in step S501, first the evolution computing portion 25 calculates the evaluation values F(X) of respective individuals. More specifically, the evaluation values F(X) of respective individuals are calculated by using following Eq. (7) to Eq. (11), based on the evaluation values of the output values Yout of any learning images by using the corresponding neural network. Where Eq. (7) is a computation expression for an evaluation value f (X1) of the output values Yout of the learning images having the identification numbers ID=1 to 46, and Eq.(8) is a computation expression for an evaluation value f(X2) of the output values Yout of the learning images having the identification numbers ID=47 to 106. Also, Eq. (9) is a computation expression for an evaluation value f(X3) of the output values Yout of the learning images having the identification numbers ID=47 to 106, and Eq. (10) is a computation expression for an evaluation value f(X4) of the output values Yout of the learning images having the identification numbers ID=107 to 166.

$$f(X1) = (y1 \cdot y1) \cdot (1-y2) \cdot (1-y3) \cdot (1-y4) \tag{7}$$

$$f(X2) = (1-y1) \cdot (y2 \cdot y2) \cdot (1-y3) \cdot (1-y4) \tag{8}$$

$$f(X3) = (1-y1) \cdot (1-y2) \cdot (y3 \cdot y3) \cdot (1-y4) \tag{9}$$

$$f(X4) = (1-y1) \cdot (1-y2) \cdot (1-y3) \cdot (y4 \cdot y4) \tag{10}$$

$$F(X) = f(X1) \cdot f(X2) \cdot f(X3) \cdot f(X4) \tag{11}$$

Here, the evaluation values F(X) of respective individuals take values that range from "0" to "1", and also an level of the evaluation becomes higher as the value comes closer to "1".

Then, if the process goes from step S501 to step S502, the evolution computing portion 25 rearrange 400 individuals used in the neural network in order of higher evaluation based on the calculated evaluation values F(X) of respective individuals. Then, in step S503, the evolution computing portion 25 decides the individual having the highest evaluation as the elite, and then carries forward the elite individual to the next generation.

Then, in step S504, the evolution computing portion 25 generates the individual, whose one element out of 604 elements of the elite individual is changed based on 1% fluctuation, up to 20 individuals that corresponds to 5% of 400 individuals, for example, and sets them as the next generation individuals.

Then, in step S505, the evolution computing portion 25 extracts any two individuals from 399 individuals except the elite individual by using a random-number generator in the development language, and then generates new two individuals by exchanging any element between two extracted individuals (one-point intersection). Such generation of the individual using the intersection between two individuals is executed repeatedly until the new individual is generated up to 379 individuals. In the present embodiment, the intersection between the elements of two individuals is carried out with a probability of 80%, for example. In other words, the evolution computing portion 25 generates numerical values from "0" to "100" by using the random-number generator in the development language, and then crosses any element between two individuals based on one-point intersection if the generated numerical value is "80" or less. In this case, the generated numerical value is "80" or more, the individual as extracted is set as the new individual.

Then, in step S506, the evolution computing portion 25 makes a decision of the mutation in all elements of 379 individuals generated in step S505, and then replaces the element that is decided as the mutation with the new value that is set within a range of ±10.0 from the concerned element. Then, the process gets out of the routine. In the present embodiment, the decision of the mutation in respective elements is carried out with a probability of 10%, for example. In other words, the evolution computing portion 25 generates the numerical values from "0" to "100" by the random-number generator in the development language to correlate with respective elements, and then causes the mutation of the corresponding element if the generated numerical value is "10" or less.

In contrast, in step S203 of the main routine, if it is decided that the neural network whose discrimination rate is 100% is present, the process of the computer 21 goes to step S205. Thus, the computer 21 applies the process to all learning images by using the neural network whose discrimination rate is decided as 100% in above step S202. Then, in step S206, the computer 21 calculates the discrimination rate of the three-dimensional object by using the neural network whose discrimination rate is decided as 100% in above step S202, based on the processed results of all learning images in step S205. Then, the process goes back to step S207.

Now, concretely the process in step S205 is executed by the learning image processing portion 23 in compliance with the subroutine shown in FIG. 9, for example, like the process in above step S201. In this case, the number M of the learning images is "211" because all learning images stored in the learning image storing portion 22 are employed herein, and also the number of the neural network is "1" because only the neural network whose discrimination rate is decided as 100% is used.

Also, concretely the process in step S206 is executed by the discrimination rate evaluating portion 24 in compliance with the subroutine shown in FIG. 10, for example, like the process in above step S202. In this case, the number M of the learning images is also given as "211" because the calculation of the discrimination rate is executed based on the processed results of all learning images.

In the main routine, if the process goes to step S207, the computer 21 checks whether or not the discrimination rate calculated in above step S206 corresponds to 100%. Then, if such discrimination rate does not correspond to 100%, the process goes to step S208. Then, in step S208, the computer 21 selects a to-be-added learning image to execute again the processes in above steps S201 to S204 after the new learning image is added. Then, the process goes back to step S201.

Concretely, the process in step S208 is executed by the learning image storing portion 22 in compliance with the subroutine shown in FIG. 12, for example. The learning image storing portion 22 selects the newly added learning image from 211 sheets of stored learning images, based on the output values Yout of the learning images in above step S205. In other words, in starting the subroutine, in step S601, first the learning image storing portion 22 selects the learning image having the identification number ID=1 from the stored learning images.

Then, in step S602, the learning image storing portion 22 checks whether or not the identification number ID of the selected learning image indicates the two-surfaced cube. If it is decided that the identification number indicates the two-surfaced cube, the process goes to step S605. If the process goes from step S602 to step S605, the learning image storing portion 22 calculates an evaluation value G(X1) by a following Eq.(12) while using the processed results (output values Yout (=(y1, y2, y3, y4))) corresponding to the selected learning image in step S205, and holds the calculated numerical value.

$$G(X1)=(y1+(1-y2)+(1-y3)+(1-y4))/4 \quad (12)$$

In contrast, in step S602, if it is decided that the identification number ID of the selected learning image does not indicate the two-surfaced cube and then the process goes to step S603, the learning image storing portion 22 checks whether or not the identification number ID indicates the three-surfaced cube.

Then, in step S603, if it is decided that the identification number ID indicates the three-surfaced cube, the process of the learning image storing portion 22 goes to step S606. Thus, the learning image storing portion 22 calculates an evaluation value G(X2) by a following Eq. (13) while using the processed results (output values Yout (=(y1, y2, y3, y4))) corresponding to the selected learning image in step S205, and holds the calculated numerical value.

$$G(X2)=((1-y1)+y2+(1-y3)+(1-y4))/4 \quad (13)$$

In contrast, in step S603, if it is decided that the identification number ID of the selected learning image does not indicate the three-surfaced cube and then the process goes to step S604, the learning image storing portion 22 checks whether or not the identification number ID indicates the circular cone.

Then, in step S604, if it is decided that the identification number ID indicates the circular cone, the process of the learning image storing portion 22 goes to step S607. Thus, the learning image storing portion 22 calculates an evaluation value G(X3) by a following Eq. (14) while using the processed results (output values Yout (=(y1, y2, y3, y4))) corresponding to the selected learning image in step S205, and holds the calculated numerical value.

$$G(X3)=((1-y1)+(1-y2)+y3+(1-y4))/4 \quad (14)$$

In contrast, in step S604, if it is decided that the identification number ID does not indicate the circular cone (i.e., it is decided that the identification number ID indicates the solid sphere), the process of the learning image storing portion 22 goes to step S608. Thus, the learning image storing portion 22 calculates an evaluation value G(X4) by a following Eq. (15) while using the processed results (output values Yout (=(y1, y2, y3, y4))) corresponding to the selected learning image in step S205, and holds the calculated numerical value.

$$G(X4)=((1-y1)+(1-y2)+(1-y3)+y4)/4 \qquad (15)$$

If the process goes from step S605, step S606, step S607 or step S608 to step S609, the learning image storing portion 22 checks whether or not the identification number ID of the learning image selected at present corresponds to ID=211. Then, in step S609, if it is decided that the identification number ID of the learning image selected at present corresponds to ID<211, the process of the learning image storing portion 22 goes to step S610. Thus, the learning image storing portion 22 increments the identification number ID (ID←ID+1) and then selects the next learning image. Then the process goes back to step S602.

In contrast, in step S609, if it is decided that the identification number ID of the learning image selected at present corresponds to ID=211 and then the process goes to step S611, the learning image storing portion 22 searches the learning image whose evaluation value G(X) is lowest every type of the learning image. More particularly, in step S611, the learning image storing portion 22 searches the learning image whose evaluation value G(X1) is lowest from the learning images of the two-surfaced cube and sets the concerned learning image as an image G1, and also searches the learning image whose evaluation value G(X2) is lowest from learning images of the three-surfaced cube and sets the concerned learning image as an image G2. Also, the learning image storing portion 22 searches the learning image whose evaluation value G(X3) is lowest from learning images of the circular cone and sets the concerned learning image as an image G3, and also search the learning image whose evaluation value G(X4) is lowest from learning images of the solid sphere and sets the concerned learning image as an image G4.

Then, in step S612, the learning image storing portion 22 checks whether or not G(X1) corresponds to the minimum value out of four evaluation values G(X1) to G(X4) corresponding to respective images G1 to G4. Then, in step S612, if it is decided that G(X1) corresponds to the minimum value, the process of the learning image storing portion 22 goes to step S615. Thus, the learning image storing portion 22 holds the learning image being set as the image G1 as the to-be-added learning image. Then, the process comes out of the routine.

In contrast, in step S612, if it is decided that G(X1) does not correspond to the minimum value and the process goes to step S613, the learning image storing portion 22 checks whether or not G(X2) corresponds to the minimum value out of four evaluation values G(X1) to G(X4) corresponding to respective images G1 to G4.

Then, in step S613, if it is decided that G(X2) corresponds to the minimum value, the process of the learning image storing portion 22 goes to step S616. Thus, the learning image storing portion 22 holds the learning image being set as the image G2 as the to-be-added learning image. Then, the process gets out of the routine.

In contrast, in step S613, if it is decided that G(X2) does not correspond to the minimum value and the process goes to step S614, the learning image storing portion 22 checks whether or not G(X3) corresponds to the minimum value out of four evaluation values G(X1) to G(X4) corresponding to respective images G1 to G4.

Then, in step S614, if it is decided that G(X3) corresponds to the minimum value, the process of the learning image storing portion 22 goes to step S617. Thus, the learning image storing portion 22 holds the learning image being set as the image G3 as the to-be-added learning image. Then, the process comes out of the routine.

In contrast, in step S614, if it is decided that G(X3) does not correspond to the minimum value (i.e., it is decided that G(X4) is the minimum value), the process of the learning image storing portion 22 goes to step S618. Thus, the learning image storing portion 22 holds the learning image set as the image G4 as the to-be-added learning image. Then, the process gets out of the routine.

According to such mode, the input values Xin having a predetermined number of pixels are set based on the distance data group indicating the same three-dimensional object on the distance image, then the output values Yout having the different pattern are calculated every type of the three-dimensional objects that are set previously by using the neural network that has at least such input values as the input to the input layer, and then the type of the three-dimensional object is discriminated based on the calculated output patterns. Therefore, the three-dimensional object can be discriminated by a simple process with good precision without the provision of the massive database, and the like.

In other words, the discrimination of the three-dimensional object is carried out based on the output patterns of the neural network that has the input values Xin being set based on the distance data group of the three-dimensional object as the inputs to the input layer. Therefore, the three-dimensional object can be discriminated by a simple process not to need the massive database, and the like.

Also, since the typical distance data used every small area, which is obtained by dividing the minimum area containing the distance data group by the set number of partition, as respective elements xi constituting the input values Xin, the input values Xin having the uniform number of elements can be set irrespective of a size of the distance data group, and the like. In this case, because the mean value of the distance data for each small area is set particularly as respective elements xi of the input values Xin, a discrimination precision of the three-dimensional object can be maintained even when a mismatching between the pixels, an omission of the distance data, etc. occur in generating the distance image.

Also, respective weighting factors Kij, Kjk of the neural network are set by the genetic algorithm that uses a plurality of previously prepared distance images as the learning image. Therefore, the neural network that makes the discrimination of the three-dimensional object possible with good precision can be set up easily in a short time.

Now, the foregoing three-dimensional object recognizing system 1 can be preferably applied to the vehicle driving aiding system that recognizes the three-dimensional object located on the outside of the vehicle by generating the distance image from the image pairs, which are obtained by picking up the front-side situation of own vehicle by the stereoscopic camera, and then executes various driving aiding controls such as alarm control, vehicle behavior control, and so on based on the recognized three-dimensional object, for example. In this case, a car, a truck, a bicycle, a walker, etc., for example, can be set as the type of the three-dimensional object to be discriminated. Therefore, various effective driving aiding controls can be realized by setting appropriately the neural network that outputs the different output pattern in response to the type of the three-dimensional objects.

In this case, the application of the above three-dimensional object recognizing system 1 is not limited to the above vehicle driving aiding system. For example, it is of course that the above three-dimensional object recognizing system 1 can also be applied to the three-dimensional object recognizing system such as various working robots, various monitoring systems, etc.

Also, in the above three-dimensional object recognizing system 1, the structure, the number of nodes, etc. of the neural network may be varied appropriately in response to various conditions such as type, shape, etc. of the three-dimensional object to be discriminated. Also, it is of course that the number of elements of the input values Xin and the output values Yout, and the like may be varied appropriately.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A three-dimensional object recognizing system comprising:
    a distance image generating portion for generating a distance image including three-dimensional distance data of a picked-up object, by using images picked up by an imaging portion; and
    a computer coupled to said distance image generating portion, comprising:
        a grouping processing portion for grouping the distance data indicating the picked-up object on the distance image;
        an input value setting portion for setting an area having a previously set predetermined profile and containing distance data group for the picked-up object on the distance image, and setting input values having an are distance data for every one of a plurality of partitioned areas of the distance image;
        a computing portion for computing output values having a pattern that responds to a previously set three-dimensional object by using a neural network that has at least the input values as inputs to an input layer; and
        a discriminating portion for discriminating the three-dimensional object based on the pattern of the output values computed by the computing portion.

2. A three-dimensional object recognizing system according to claim 1, wherein the input value setting portion sets a rectangular profile surrounding the distance data group on the distance image, and sets the plurality of partitioned areas, each side of which circumscribes any pixel of the distance data group, by reducing the rectangular profile on a line by line basis.

3. A three-dimensional object recognizing system according to claim 1, wherein the input value setting portion sets a mean value of distance data for every one of the plurality of areas as an element of the input values.

4. A three-dimensional object recognizing system according to claim 3, wherein the input value setting portion calculates the mean value of distance data for every one of the plurality of areas at a subpixel level.

5. A three-dimensional object recognizing system according to claim 1, wherein at least one weighting factor set in the neural network used by the computing portion are set by a genetic algorithm that employs a plurality of previously prepared distance images as a learning image.

6. A three-dimensional object recognizing system according to claim 5, further comprising a control parameter learning unit configured to set the at least one weighting factor based on the previously set three-dimensional object.

7. A three-dimensional object recognizing system according to claim 6, wherein the control parameter learning unit includes an evolution computing portion configured to adjust the weighting factors based on the genetic algorithm.

8. A three-dimensional object recognizing system according to claim 1, wherein the pattern corresponding to the three-dimensional object is set as a different pattern for every type of the three-dimensional object, and the discriminating portion specifies the type of the three-dimensional object based on the pattern.

9. A three-dimensional object recognizing system according to claim 1, wherein the neural network comprises a hierarchical type neural network comprising the input layer, a middle layer, and an output layer, and
    wherein the output values are output from the output layer.

10. A three-dimensional object recognizing system according to claim 9, wherein each of the input layer, the middle layer, and the output layer includes a plurality of nodes.

11. A three-dimensional object recognizing system according to claim 10, wherein the neural network is configured to apply a first weighting factor between nodes of the input layer and the middle layer,
    wherein the neural network is configured to apply a second weighting factor between nodes of the middle layer and the output layer, and
    wherein the first and second weighting factors are based on the previously set three-dimensional object.

12. A three-dimensional object recognizing system according to claim 11, wherein the first and second weighting factors set in the neural network used by the computing portion are set by a genetic algorithm that employs a plurality of previously prepared distance images as a learning image.

13. A three-dimensional object recognizing system according to claim 11, further comprising a control parameter learning unit configured to set the first and second weighting factors based on the previously set three-dimensional object.

14. A three-dimensional object recognizing system according to claim 13, wherein the control parameter learning unit includes an evolution computing portion configured to adjust the first and second weighting factors based on the genetic algorithm.

15. A three-dimensional object recognizing system according to claim 1, wherein the grouping processing portion is adapted to calculate a planar expression as a ground surface and to extract the distance data which are located lower than the planar expression.

16. A three-dimensional object recognizing system according to claim 1, wherein a range including the group comprises a minimum rectangle.

17. A three-dimensional object recognizing method comprising:
    generating in a distance image generating portion a distance image, including three-dimensional distance data of a picked-up object, by using images picked up by an imaging portion; and
    in a computer coupled to said distance image generating portion:
        grouping the distance data indicating the picked-up object on the distance image;
        setting an area having a previously set predetermined profile and containing a distance data group for the picked-up object on the distance image, and setting input values having an area distance data for every one of a plurality of partitioned areas of the distance image;

computing output values having a pattern that responds to a previously set three-dimensional object by using a neural network comprising an input layer and including at least the input values as inputs to the input layer; and discriminating the three-dimensional object based on the pattern of the output values computed by the computing portion.

18. A three-dimensional object recognizing method according to claim 17, wherein at least one weighting factor is set in the neural network used by the computing portion are set by a genetic algorithm that employs a plurality of previously prepared distance images as a learning image.

19. A three-dimensional object recognizing method according to claim 18, wherein the at least one weighting factor is based on the previously set three-dimensional object.

20. A three-dimensional object recognizing method according to claim 18, further comprising adjusting the at least one weighting factor based on the genetic algorithm.

* * * * *